United States Patent
Liang et al.

(10) Patent No.: US 9,891,618 B2
(45) Date of Patent: Feb. 13, 2018

(54) PROGRAM CORRECTING DEVICE AND PROGRAM CORRECTING METHOD OF INDUSTRIAL ROBOT

(71) Applicant: FANUC Corporation, Yamanashi (JP)

(72) Inventors: Yanxue Liang, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 64 days.

(21) Appl. No.: 14/933,133

(22) Filed: Nov. 5, 2015

(65) Prior Publication Data

US 2016/0129589 A1   May 12, 2016

(30) Foreign Application Priority Data

Nov. 6, 2014   (JP) .................................. 2014-226498

(51) Int. Cl.
*G05B 19/41*   (2006.01)
*G05B 19/416*   (2006.01)

(52) U.S. Cl.
CPC .. *G05B 19/416* (2013.01); *G05B 2219/43011* (2013.01); *G05B 2219/43129* (2013.01); *Y10S 901/02* (2013.01)

(58) Field of Classification Search
CPC ........ G05B 19/416; G05B 2219/43011; G05B 2219/43129; Y10S 901/02
USPC ......................................... 700/245, 250, 254
See application file for complete search history.

(56) References Cited

U.S. PATENT DOCUMENTS

| | | | | |
|---|---|---|---|---|
| 6,463,358 B1* | 10/2002 | Watanabe | .............. | B25J 9/1674 318/14 |
| 7,298,385 B2* | 11/2007 | Kazi | ...................... | B25J 9/1671 345/633 |
| 8,831,777 B2* | 9/2014 | Kimoto | .................. | B25J 9/1651 700/245 |
| 2009/0043425 A1* | 2/2009 | Ito | .......................... | B25J 9/1671 700/256 |
| 2010/0262288 A1* | 10/2010 | Svensson | ............... | B25J 9/1671 700/254 |
| 2011/0087373 A1* | 4/2011 | Nagatsuka | ............. | B25J 9/1674 700/254 |

(Continued)

FOREIGN PATENT DOCUMENTS

| | | |
|---|---|---|
| JP | 61-34610 A | 2/1986 |
| JP | 4-8487 A | 1/1992 |
| JP | H11-039021 A | 2/1999 |

*Primary Examiner* — Patrick H Mackey
(74) *Attorney, Agent, or Firm* — Hauptman Ham, LLP

(57) ABSTRACT

A program correcting device comprises an executing part which executes a simulation of operation of the robot based on an operating program, a calculating part which calculates a variation with time of a TCP speed from the simulation results, an evaluating part which evaluates a pattern of the calculated variation with time if a minimum value of the TCP speed during the calculated variation with time is a predetermined lower limit value or less, a selecting part which selects a correction scheme of the operating program for increasing the minimum value of the TCP speed from a plurality of correction schemes, in accordance with the evaluation results of the pattern of the variation with time, and a correcting part which corrects the operating program in accordance with the selected correction scheme.

14 Claims, 10 Drawing Sheets

(56) References Cited

U.S. PATENT DOCUMENTS

2016/0129589 A1* 5/2016 Liang .................. G05B 19/416
                                                    700/254
2017/0038756 A1* 2/2017 Novakovic ............ G05B 19/19

* cited by examiner

```
......
4:Line pos[1] 100mm/sec CNT100
5:Line pos[2] 100mm/sec CNT100
6:Line pos[3] 100mm/sec CNT100
7:Line pos[4] 100mm/sec CNT100
......
```

FIG. 5

```
......
4:Line pos[1] 100mm/sec CNT100
5:Line pos[2] 100mm/sec CNT100
6:Line pos[5] 200mm/sec CNT100
7:Line pos[3] 100mm/sec CNT100
8:Line pos[4] 100mm/sec CNT100
......
```

FIG. 6

```
......
4:Line pos[1] 100mm/sec CNT100
5:Line pos[2] 100mm/sec CNT100
6:Line pos[5] 100mm/sec CNT100
7:Line pos[3] 100mm/sec CNT100
8:Line pos[4] 100mm/sec CNT100
......
```

FIG. 7

```
……
4:Line pos[1]  100mm/sec CNT100
5:Line pos[6]  100mm/sec CNT100
6:Line pos[2]  100mm/sec CNT100
7:Line pos[3]  100mm/sec CNT100
8:Line pos[4]  100mm/sec CNT100
…..
```

FIG. 8

```
……
4:Line pos[1]  100mm/sec CNT100
5:Line pos[6]  100mm/sec CNT100
6:Line pos[2]  100mm/sec CNT100
7:Line pos[5]  100mm/sec CNT100
8:Line pos[3]  100mm/sec CNT100
9:Line pos[4]  100mm/sec CNT100
…..
```

FIG. 14

```
......
4:Line pos[1]  100mm/sec CNT100
5:Line pos[2]  100mm/sec CNT100
6:Line pos[5]  150mm/sec CNT100
7:Line pos[3]  100mm/sec CNT100
8:Line pos[4]  100mm/sec CNT100
......
```

FIG. 15

```
......
4:Line pos[1]  100mm/sec CNT100
5:Line pos[2]  100mm/sec CNT100
6:Line pos[5]  150mm/sec CNT100
7:Line pos[3]  100mm/sec CNT100
8:Line pos[4]  100mm/sec CNT100
......
```

FIG. 16

```
......
4:Line pos[1] 100mm/sec CNT100
5:Line pos[6] 100mm/sec CNT100
6:Line pos[2] 100mm/sec CNT100
7:Line pos[3] 100mm/sec CNT100
8:Line pos[4] 100mm/sec CNT100
......
```

FIG. 17

```
......
4:Line pos[1] 100mm/sec CNT100
5:Line pos[6] 100mm/sec CNT100
6:Line pos[2] 100mm/sec CNT100
7:Line pos[5] 100mm/sec CNT100
8:Line pos[3] 100mm/sec CNT100
9:Line pos[4] 100mm/sec CNT100
......
```

PROGRAM CORRECTING DEVICE AND PROGRAM CORRECTING METHOD OF INDUSTRIAL ROBOT

RELATED APPLICATIONS

The present application claims priority to Japanese Application Number 2014-226498, filed Nov. 6, 2014, the disclosure of which is hereby incorporated by reference herein in its entirety.

BACKGROUND OF THE INVENTION

1. Field of the Invention

The present invention relates to a program correcting device and program correcting method for correcting an operating program of an industrial robot.

2. Description of the Related Art

In recent years, industrial robots such as vertical multi-articulated robots have been used for laser cutting, arc welding, deburring, and various other applications. Control devices of these robots execute operating programs which are prepared in advance so as to move tools which are attached to the robots (for example, laser oscillators for laser cutting) at command speeds. However, if the movement path of a tool includes a corner, the movement speed is unavoidably reduced from the command speed while the tool passes the corner. In particular, when the amount of reduction of the movement speed is large, the processing quality on a workpiece is liable to fall during the period when the tool passes the corner. For example, movement speed of the tool which is greatly lower than the command speed may result in excessive processing on the workpiece.

In relation to this, JP H11-39021A proposes a method of interpolation of a robot motion path, comprising rotating a wrist flange so that an intersecting point of a drive axis of the wrist flange and a teaching plane moves along a predetermined arc if the distance from a control point which is set on the tip of the tool to a corner becomes smaller than a predetermined reference distance. According to the method of interpolation of a path in JP H11-39021A, the wrist flange is rotated smoothly rotate so that the control point is linearly moved on the teaching plane, and therefore it is possible to prevent the movement speed from reducing while the control point passes the corner. However, if the method of interpolation of a path in JP H11-39021A is employed, it is necessary to orient the flange surface of the wrist flange to which the tool is mounted, to be parallel to the teaching plane. In order to orient the wrist flange in this way, it is necessary to change the hardware settings of the robot in detail, and a user would find it difficult to change such settings.

A device and method which can reduce the drop in speed of the tip of a tool without changing the hardware settings of the robot have been sought.

SUMMARY OF INVENTION

According to a first aspect of the present invention, there is provided a program correcting device which corrects an operating program of a robot for moving a tip of a tool which is attached to the robot along a predetermined movement path at a command speed, comprising an executing part which executes a simulation of operation of the robot based on the operating program, a calculating part which calculates a variation with time of a movement speed of the tip for a period when the tip passes through the movement path from the results of the simulation of operation, an evaluating part which evaluates a pattern of the variation with time calculated by the calculating part if a minimum value of the movement speed during the variation with time calculated by the calculating part is a predetermined lower limit value or less, a selecting part which selects a correction scheme of the operating program which increases the minimum value of the movement speed from a predetermined plurality of correction schemes, in accordance with the results of evaluation of the pattern of the variation with time, and a correcting part which corrects the operating program in accordance with the correction scheme selected by the selecting part.

According to a second aspect of the present invention, there is provided a program correcting device in the first aspect, wherein the correcting part repeatedly corrects the operating program until a minimum value of the movement speed during the variation with time becomes larger than the lower limit value.

According to a third aspect of the present invention, there is provided a program correcting device in the first or second aspect, wherein the operating program comprises a plurality of operating commands to be executed in sequence, and the calculating part calculates the variation with time while the plurality of operating commands are executed in sequence.

According to a fourth aspect of the present invention, there is provided a program correcting device in the third aspect, wherein the evaluating part evaluates the pattern of the variation with time based on monotonicity of the variation with time in a first section between the time when the movement speed starts to decrease from the command speed and the time when the movement speed reaches the minimum value, and in a second section between the time when the movement speed starts to increase from the minimum value and the time when the movement speed converges to the command speed.

According to a fifth aspect of the present invention, there is provided a program correcting device in the fourth aspect, wherein the plurality of correction schemes include a first correction scheme which comprises adding a new operating command right after the operating command among the plurality of operating commands where the movement speed starts to decrease from the command speed, and the selecting part selects the first correction scheme if the variation with time in the first section is monotonous decrease and the variation with time in the second section is a monotonous increase.

According to a sixth aspect of the present invention, there is provided a program correcting device in the fourth or fifth aspect, wherein the plurality of correction schemes include a second correction scheme which comprises changing an operating command right after the operating command among the plurality of operating commands where the movement speed starts to decrease from the command speed, and the selecting part selects the second correction scheme when the variation with time in the first section is a monotonous decrease and the variation with time in the second section is a non-monotonous increase.

According to a seventh aspect of the present invention, there is provided a program correcting device in any one of the fourth to sixth aspects, wherein the plurality of correction schemes include a third correction scheme which comprises deleting an operating command right after the operating command among the plurality of operating commands where the movement speed reaches the minimum value, and the selecting part selects the third correction scheme when the variation with time in the first section a non-monotonous decrease.

According to an eighth aspect of the present invention, there is provided a program correcting method which corrects an operating program for moving a tip of a tool which is attached to the robot along a predetermined movement path at a command speed, comprising executing a simulation of operation of the robot based on the operating program, calculating a variation with time of a movement speed of the tip for the period when the tip passes through the movement path from the results of the simulation of operation, evaluating a pattern of the calculated variation with time if a minimum value of the movement speed during the calculated variation with time is a predetermined lower limit value or less, selecting a correction scheme of the operating program for increasing the minimum value of the movement speed from a predetermined plurality of correction schemes, in accordance with the results of evaluation of the pattern of the variation with time, and correcting the operating program in accordance with the selected correction scheme.

According to a ninth aspect of the present invention, there is provided a program correcting method in the eighth aspect further comprising repeatedly correcting the operating program until a minimum value of the movement speed during the variation with time becomes larger than the lower limit value.

According to a 10th aspect of the present invention, there is provided a program correcting method in the eighth or ninth aspect, wherein the operating program comprises a plurality of operating commands to be executed in sequence, and the program correcting method further comprises calculating the variation with time while the plurality of operating commands are executed in sequence.

According to an 11th aspect of the present invention, there is provided a program correcting method in the 10th aspect further comprising evaluating the pattern of the variation with time based on monotonicity of the variation with time in a first section between the time when the movement speed starts to decrease from the command speed and the time when the movement speed reaches the minimum value, and in a second section between the time when the movement speed starts to increase from the minimum value and the time when the movement speed converges to the command speed.

According to a 12th aspect of the present invention, there is provided a program correcting device in the 11th aspect, wherein the plurality of correction schemes include a first correction scheme which comprises adding a new operating command right after the operating command among the plurality of operating commands where the movement speed starts to decrease from the command speed, and the program correcting method further comprises selecting the first correction scheme when the variation with time in the first section is a monotonous decrease and the variation with time in the second section is a monotonous increase.

According to a 13th aspect of the present invention, there is provided a program correcting method in the 11th or 12th aspects, wherein the plurality of correction schemes include a second correction scheme which comprises changing an operating command right after the operating command among the plurality of operating commands where the movement speed starts to decrease from the command speed, and the program correcting method further comprises selecting the second correction scheme when the variation with time in the first section is a monotonous decrease and the variation with time in the second section is a non-monotonous increase.

According to a 14th aspect of the present invention, there is provided a program correcting method in any one of the 11th to the 13th aspects, wherein the plurality of correction schemes include a third correction scheme which comprises deleting an operating command right after the operating command among the plurality of operating commands where the movement speed reaches the minimum value, and the program correcting method further comprises selecting the third correction scheme when the variation with time in the first section is a non-monotonous decrease.

These and other objects, features, and advantages of the present invention will become clearer with reference to the detailed description of an illustrative embodiment of the present invention which is shown in the attached drawings.

BRIEF DESCRIPTION OF THE DRAWINGS

FIG. 5 is a schematic view which shows a second example of an operating program of a robot in FIG. 1.

FIG. 6 is a schematic view which shows a third example of an operating program of a robot in FIG. 1.

FIG. 7 is a schematic view which shows a fourth example of an operating program of a robot in FIG. 1.

FIG. 8 is a schematic view which shows a fifth example of an operating program of a robot in FIG. 1.

FIG. 14 is a schematic view which shows the results of correction of an operating program of FIG. 3 according to a first correction scheme.

FIG. 15 is a schematic view which shows the results of correction of an operating program of FIG. 6 according to a second correction scheme.

FIG. 16 is a schematic view which shows the results of correction of an operating program of FIG. 7 according to a third correction scheme.

FIG. 17 is a schematic view which shows the results of correction of an operating program of FIG. 8 according to a fourth correction scheme.

DETAILED DESCRIPTION OF EMBODIMENTS

Figure 1:
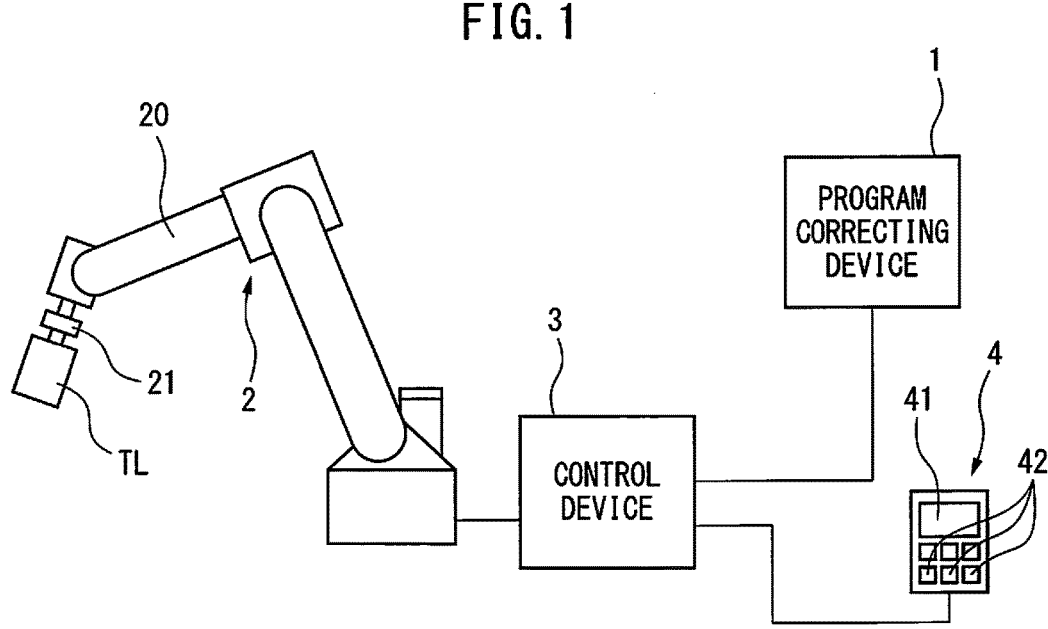
FIG. 1 is a block diagram which shows the configuration of a robot system including a program correcting device of one embodiment of the present invention.

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Referring to FIG. 1 to FIG. 20, a program correcting device of one embodiment of the present invention will be explained. FIG. 1 is a block diagram which shows the configuration of an illustrative robot system which includes the program correcting device 1 of the present embodiment. As shown in FIG. 1, the robot system of the present example includes an industrial robot 2 and a control device 3 which controls the operation of the robot 2. The program correcting device 1 is connected to the control device 3. The control device 3 further has a teaching panel 4 connected to it. Before explaining details of the program correcting device 1 of the present embodiment, the robot 2, control device 3, and teaching panel 4 will be simply explained.

As shown in FIG. 1, the robot 2 of the present example is a general vertical multi-articulated robot and is provided with an arm 20 to which various tools TL are mounted. The tools TL which are attached to the wrist part 21 of the arm 20, for example, include a laser oscillator for laser cutting, a welding torch for arc welding, a spindle for deburring, etc. Further, the control device 3 of the present example is a digital computer which is provided with a CPU, memory device, input device, display device, etc. and has the function of controlling the operations of various parts of the robot 2 in accordance with an operating program which is prepared in advance.

Further, the teaching panel 4 of the present example is a specialized piece of equipment which is used for a teaching operation of a robot 2 and is provided with a display part 41 which displays various information to the operator and an input part 42 which receives input of a teaching operation from the operator. The teaching panel 4 of the present example has the function of working with the control device 3 to generate an operating program of the robot 2. More specifically, if the operator uses the teaching panel 4 to execute the teaching operation of the robot 2, the operating program for generating the operation of the robot 2 by the teaching operation is generated at the control device 3. The operating program which is generated in this way is transmitted to the program correcting device 1 and stored in the memory part 1 of the memory part 1M of the program correcting device 1.

Figure 2:
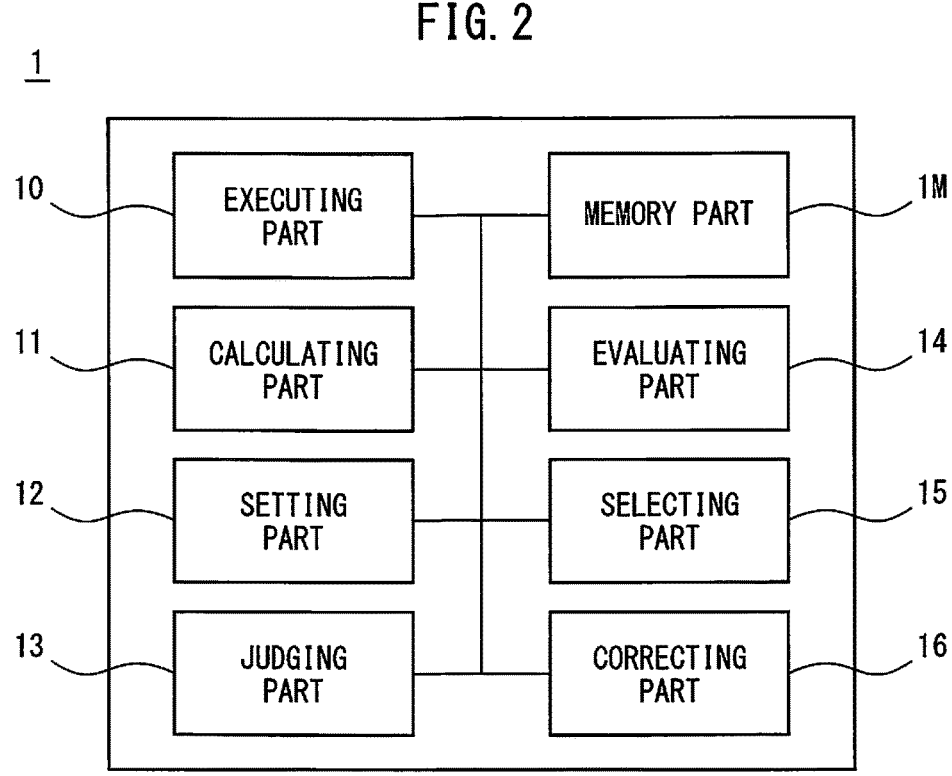
FIG. 2 is a block diagram which shows the configuration of a program correcting device in FIG. 1.

FIG. 2 is a block diagram which shows the configuration of the program correcting device 1 in FIG. 1. The program correcting device 1 of the present example is a digital computer similar to the control device 3 and has the function of running a simulation of operation of the robot 2 based on the operating program which is generated by the teaching operation, the function of correcting the operating program in accordance with the results of simulation of operation, etc. The program correcting device 1 may be built into the control device 3. As shown in FIG. 2, the program correcting device 1 of the present example has, in addition to the memory part 1M which stores various data, an executing part 10, calculating part 11, setting part 12, judging part 13, evaluating part 14, selecting part 15, correcting part 16, etc. Details of these functional parts will be explained later. As explained above, the memory part 1M stores the operating program of the robot 2 in advance.

Figures 3, 4:
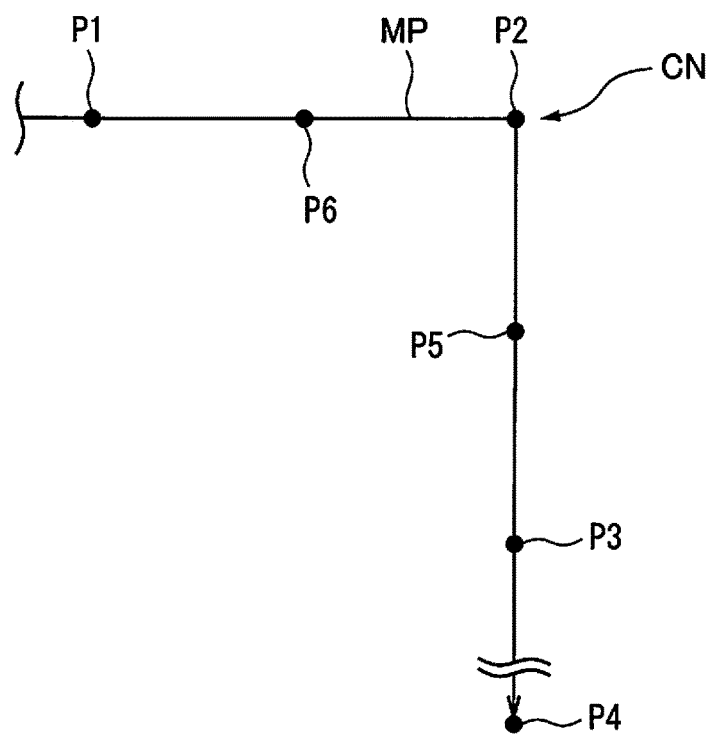
FIG. 3 is a schematic view which shows a first example of an operating program of a robot in FIG. 1.
FIG. 4 is a schematic view which shows part of a movement path of a tip of a tool according to an operating program of FIG. 3.

FIG. 3 is a schematic view which shows a first example of the operating program of the robot 2. As shown in FIG. 3, the operating program of the present example comprises a plurality of operating commands to be executed in sequence. More specifically, the operating program of the present example is used for moving a tip of a tool TL which is attached to a robot 2 along a predetermined movement path MP at a command speed Vc. The command speed Vc of the present example is 100 mm/sec. FIG. 4 is a schematic view which shows one part of the movement path MP of the tip of the tool according to an operating program of FIG. 3. As shown in FIG. 4, the movement path MP of the present example includes a corner CN where the direction of advance of the tip of the tool changes. The first teaching point P1 on the movement path MP of FIG. 4 is a teaching point which is positioned before the corner CN, while the second teaching point P2 is a teaching point where the direction of advance of the tip of the tool changes. Further, the third teaching point P3 on the movement path MP of FIG. 4 is the teaching point which is positioned after the corner CN, while the fourth teaching point P4 is the teaching point which is positioned on the extension line of the path from the second teaching point P2 to the third teaching point P3. The other teaching points on the movement path MP will be explained later. In the following explanation, the tip of the tool TL will sometimes be referred to as the "TCP (Tool Center Point)". If referring to FIG. 3 here, the fourth line of the operating program of the present example (4: Line pos[1] 100 mm/sec CNT100) is an operating command for moving the TCP of the robot 2 by linear interpolation to the first teaching point P1 in FIG. 4 at a speed 100 mm/sec.

Similarly, the fifth line of the operating program of FIG. 3 (5: Line pos[2] 100 mm/sec CNT100) is an operating command for moving the TCP of the robot 2 by linear interpolation to the second teaching point P2 in FIG. 4 at a speed of 100 mm/sec. Further, the sixth line (6: Line pos[3] 100 mm/sec CNT100) of the operating program of FIG. 3 is an operating command for moving the TCP of the robot 2 by linear interpolation to the third teaching point P3 in FIG. 4 by a speed of 100 mm/sec. Further, the seventh line of the operating program of FIG. 3 (7: Line pos[4] 100 mm/sec CNT100) is an operating command for moving the TCP of the robot 2 by linear interpolation to the fourth teaching point P4 in FIG. 4 by a speed of 100 mm/sec.

Note that, in the operating commands, "CNT100" is a command for positioning the tip of the tool at the command position without decelerating, and for starting each operating command right after completion of the preceding operating command. As shown in FIG. 4, if the movement path MP of the tip of the tool has a corner CN, the movement speed of the tip of the tool is liable to greatly drop from the command speed Vc while the tip of the tool passes the corner CN. As a result, the processing precision of the workpiece is liable to fall. For this reason, the program correcting device 1 of the present embodiment has the function of correcting the operating program so that the movement speed for the period when the tip of the tool passes the corner CN does not greatly fall from the command speed Vc. This point will be explained further later. FIG. 5 to FIG. 8 show other examples of the operating program of the robot 2.

Figure 9:
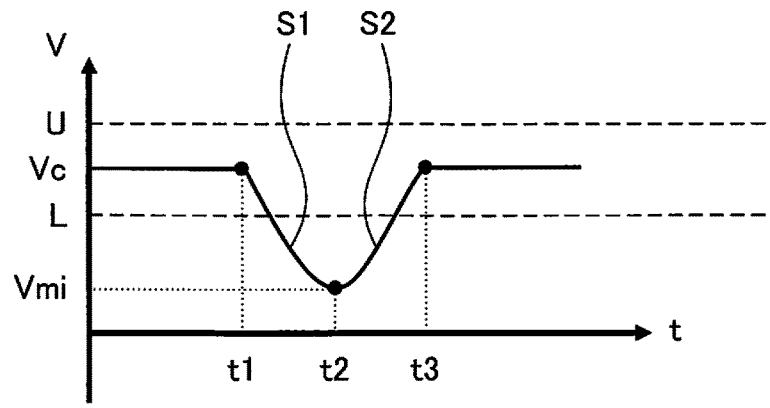
FIG. 9 is a graph which shows a variation with time of a movement speed of a tip of a tool corresponding to the operating program of FIG. 3.

Referring again to FIG. 2, the executing part 10 of the program correcting device 1 has the function of executing a simulation of operation of the robot 2 based on an operating program of the memory part 1M. Further, the calculating part 11 of the program correcting device 1 has the function of calculating the variation with time of the movement speed V of the tip of the tool for the period when the tip of the tool passes the movement path MP from the result of simulation of operation by the executing part 10. More specifically, the calculating part 11 of the present example calculates the movement speed V of the tip of the tool at a predetermined cycle, based on the speed command for the drive motor of the robot 2. In the following explanation, the movement speed V of the tip of the tool will sometimes be referred to as the "TCP speed V". The speed command for the drive motor of the robot 2 is extracted from the results of simulation of operation based on the operating program. FIG. 9 is a graph which shows the variation with time of the TCP speed V which is calculated by the calculating part 11 of the present example. The graph of FIG. 9 shows the variation with time in the TCP speed V corresponding to the operating program of FIG. 3. As will be understood from the graph of FIG. 9, if the operating program of FIG. 3 is executed, the TCP speed V starts to decrease from the command speed Vc at the time t1, and reaches the minimum value Vmi at the time t2. From the time t1 to the time t2, the TCP speed V is monotonously decreased. After that, the TCP speed V is monotonously increased until converging to the command speed Vc at the time t3. Here, the TCP speed V converging to the command speed Vc means that the TCP speed V after that is held constant at the command speed Vc.

Figure 10:
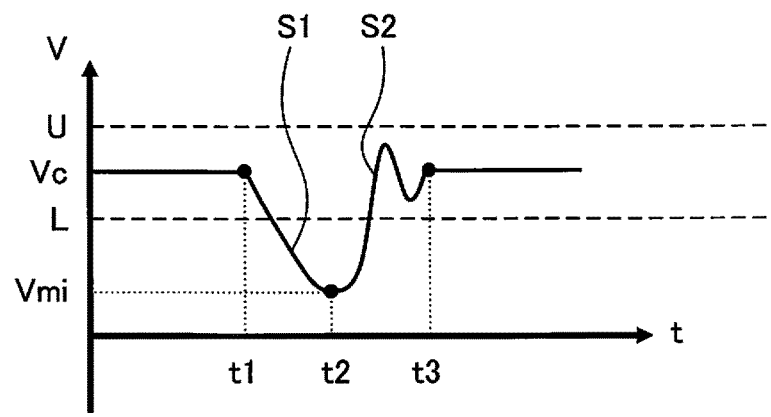
FIG. 10 is a graph which shows a variation with time of a movement speed of a tip of a tool corresponding to the operating program of FIG. 5.

FIG. 5 is a schematic view which shows a second example of the operating program of the robot 2. As will be understood from a comparison of FIG. 3 and FIG. 5, the operating program of the present example further includes an operating command for moving the tip of the tool which has reached the second teaching point P2 to the fifth teaching point P5 at a speed of 200 mm/sec (see sixth line in FIG. 5). As will be understood from FIG. 4, the fifth teaching point P5 is positioned on the line segment which connects the second teaching point P2 and the third teaching point P3. FIG. 10 is a graph which shows the variation with time of the TCP speed V corresponding to the operating program of FIG. 5. As will be understood from the graph of FIG. 10, if the operating program of FIG. 5 is executed, the TCP speed V starts to decrease from the command speed Vc at the time t1, and reaches the minimum value Vmi at the time t2. From the time t1 to the time t2, the TCP speed V monotonously decreases. After that, the TCP speed V non-monotonously increases until the command speed Vc converges at the time t3. More specifically, in the period between the time t2 and time t3, the TCP speed V converges to the command speed Vc via the local maximum and local minimum values. The local maximum value is larger than the command speed Vc. Further, the local minimum value is smaller than the command speed Vc.

Figure 11:
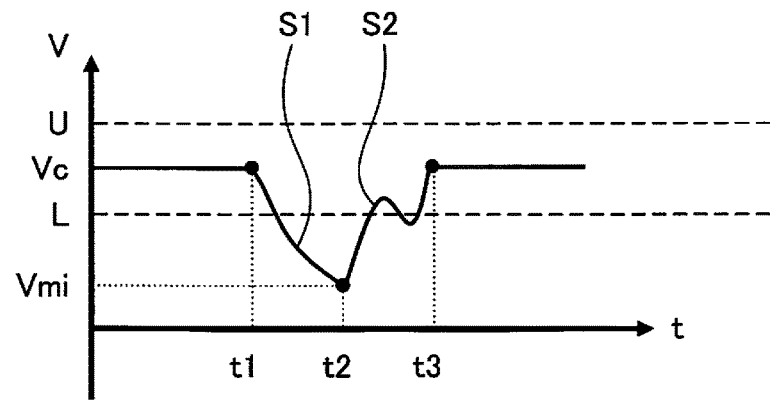
FIG. 11 is a graph which shows a variation with time of a movement speed of a tip of a tool corresponding to the operating program of FIG. 6.

FIG. 6 is a schematic view of a third example of the operating program of the robot 2 in FIG. 1. As will be understood from FIG. 5 and FIG. 6, the operating program of the present example differs from the operating program of FIG. 5 only in the numerical value of the speed command of the operating command of the sixth line. More specifically, the numerical value of the speed command at the sixth line in FIG. 5 is 200 mm/sec, while the numerical value of the speed command at the sixth line in FIG. 6 is 100 mm/sec. FIG. 11 is a graph which shows the variation with time of the TCP speed V corresponding to the operating program of FIG. 6. As will be understood from the graph of FIG. 11, if the operating program of FIG. 6 is executed, the TCP speed V starts to decrease from the command speed Vc at the time t1, and then reaches the minimum value Vmi at the time t2. From the time t1 to the time t2, the TCP speed V monotonously decreases.

After that, the TCP speed V increases non-monotonously until converging to the command speed Vc at the time t3. More specifically, in the period between the time t2 and the time t3, the TCP speed V converges to the command speed Vc via the local maximum and local minimum values. However, the local maximum value in FIG. 11 is smaller than the command speed Vc. Further, the local minimum value in FIG. 11 is smaller than the local minimum in FIG. 10 as well. As will be understood from FIG. 10 and FIG. 11, an operating command which is interposed between the operating command where the TCP speed V reaches the minimum value Vmi and the operating command where the TCP speed V converges to the command speed Vc (sixth line in FIG. 5 and FIG. 6) can cause the TCP speed V to non-monotonously increase from the minimum value Vmi to the command speed Vc.

Figure 12:
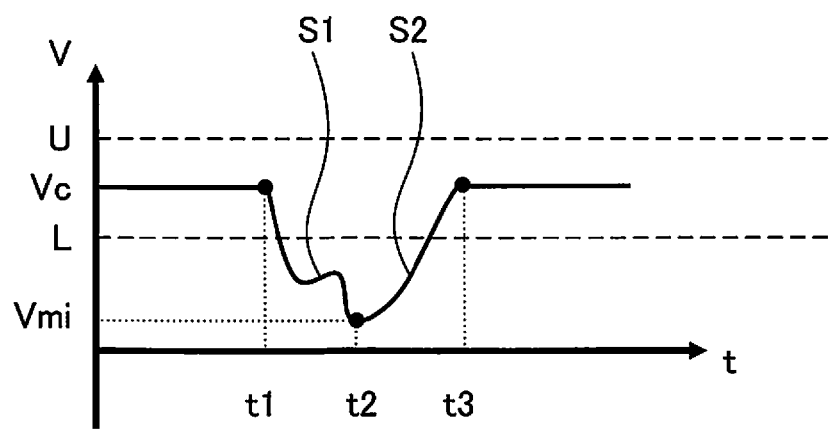
FIG. 12 is a graph which shows a variation with time of a movement speed of a tip of a tool corresponding to the operating program of FIG. 7.

FIG. 7 is a schematic view which shows a fourth example of the operating program of the robot 2. As will be understood if comparing FIG. 3 and FIG. 7, the operating program of the present example further includes an operating command for moving the tip of the tool which has reached the first teaching point P1 to the sixth teaching point P6 at a speed of 100 mm/sec (see fifth line in FIG. 7). As will be understood from FIG. 4, the sixth teaching point P6 is positioned on the line segment which connects the first teaching point P1 and the second teaching point P2. FIG. 12 is a graph which shows the variation with time of the TCP speed V corresponding to the operating program of FIG. 7. As will be understood from the graph of FIG. 12, if the operating program of FIG. 7 is executed, the TCP speed V starts to decrease from the command speed Vc at the time t1, and then reaches the minimum value Vmi at the time t2. Between the time t1 and the time t2, the TCP speed V non-monotonously decreases. More specifically, the TCP speed V reaches the minimum value Vmi via the local minimum and local maximum values, in the period between the time t1 and time t2. After that, the TCP speed V monotonously increases until converging to the command speed Vc at the time t3.

Figure 13:
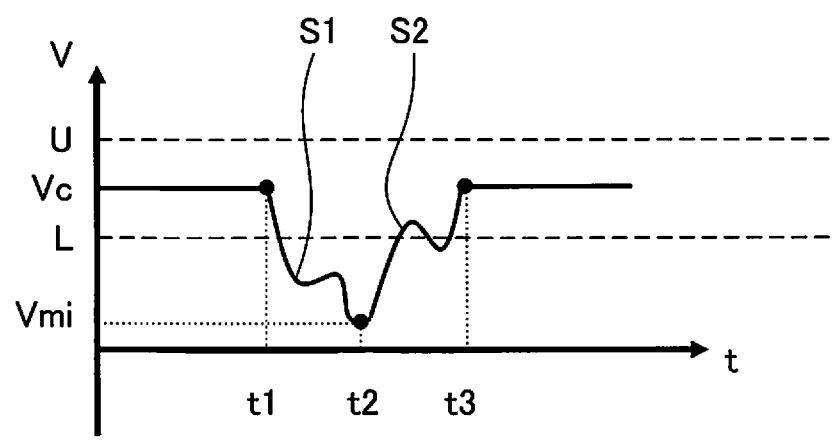
FIG. 13 is a graph which shows a variation with time of a movement speed of a tip of a tool corresponding to the operating program of FIG. 8.

FIG. 8 is a schematic view which shows a fifth example of the operating program of the robot 2. As will be understood from a comparison of FIG. 7 and FIG. 8, the operating program of the present example further includes an operating command for moving the tip of the tool which has reached the second teaching point P2 to the fifth teaching point P5 at a speed of 100 mm/sec (see seventh line in FIG. 8). As explained above, the fifth teaching point P5 is positioned on the line connecting the second teaching point P2 and the third teaching point P3. FIG. 13 is a graph which shows the variation with time of the TCP speed V corresponding to the operating program of FIG. 8.

As will be understood from the graph of FIG. 13, if the operating program of FIG. 8 is executed, the TCP speed V starts to decrease from the command speed Vc at the time t1, and then reaches the minimum value Vmi at the time t2.

From the time t1 to the time t2, the TCP speed V decreases non-monotonously. More specifically, in the period between the time t1 and time t2, the TCP speed V reaches the minimum value Vmi via the local minimum and local maximum values. After that, the speed of movement V of the tip of the tool monotonously increases until converging to the command speed Vc at the time t3. More specifically, in the period between the time t2 and time t3, the TCP speed V converges to the command speed Vc via the local maximum and local minimum values. As will be understood from FIG. 12 and FIG. 13, the operating command which is arranged right before the operating command where the TCP speed V reaches the minimum value Vmi (fifth line in FIG. 7 and FIG. 8) can cause the TCP speed V to non-monotonously decrease from the command speed Vc to the minimum value Vmi.

As explained while referring to FIG. 9 to FIG. 13, the waveform which expresses the variation with time of the TCP speed V can be deformed in various ways in accordance with the content of the operating program of the robot 2. Note that, the variation with time of the TCP speed V which has been calculated by the calculating part 11 of the present example can be stored in the memory part 1M in a predetermined format. For example, the variation with time of the TCP speed V which has been calculated by the calculating part can be stored in the form of time series data which links the numerical values of the TCP speed V which has been calculated at a predetermined cycle with line numbers of the operating program. Due to this, it is possible to confirm the correspondence between the plurality of operating commands and the variation with time of the TCP speed. For example, it is possible to specify the operating command where the TCP speed V starts to decrease from the command speed Vc, the operating command where the TCP speed V reaches the minimum value Vmi, etc.

Referring again to FIG. 2, the setting part 12 of the program correcting device 1 has the function of setting the allowable range of the TCP speed V for the period when the tip of the tool of the robot 2 passes the corner CN. Here, the "period when the tip of the tool passes the corner CN" is the period between the time when the TCP speed V starts to decrease from the command speed Vc (time t1 in FIG. 9 to FIG. 13) and the time when the TCP speed V increases from the minimum value Vmi and converges to the command speed Vc (time t3 in FIG. 9 to FIG. 13). In FIG. 3 and FIG. 5 to FIG. 8, the operating commands which define operation of the tip of the tool during the above period are underlined. In particular, in the program correcting device 1 of the present example, the upper limit value U and the lower limit value L which define the allowable range are designated by the operator in advance. These upper limit value U and lower limit value L are stored in advance in the memory part 1M etc. Examples of the upper limit value U and the lower limit value L of the allowable range of the TCP speed V are shown in the graphs of FIG. 9 to FIG. 13.

Next, the judging part 13 of the program correcting device 1 has the function of judging if the variation with time of the TCP speed V for the period when the tip of the tool passes the corner CN falls within the allowable range. In particular, the judging part 13 of the present example has the function of judging if the minimum value Vmi during the variation with time of the TCP speed V calculated by the calculating part 11 is the lower limit value L or less. In the examples which are shown in FIG. 9 to FIG. 13, in each case, the minimum value Vmi of the TCP speed V is the lower limit value L or less. Next, the evaluating part 14 of the program correcting device 1 has the function of evaluating the pattern of the variation with time of the TCP speed V if the result of judgment of the judging part 13 is positive (that is, if the minimum value Vmi of the TCP speed V is the lower limit value L or less). In the following explanation, the variation with time of the TCP speed V will sometimes simply be referred to as the "TCP speed variation". The specific routine when the evaluating part 14 of the present example evaluates the pattern of the TCP speed variation will be explained in detail below.

First, the evaluating part 14 of the present example specifies the waveform of the TCP speed variation for the period when the tip of the tool passes the corner CN, then divides the waveform of the TCP speed variation into the section from the time when the TCP speed V starts to decrease (time t1 in FIG. 9 to FIG. 13) to the time when the TCP speed V reaches the minimum value Vmi (time t2 in FIG. 9 to FIG. 13) and the section from the time when the TCP speed V starts to increase (time t2 in FIG. 9 to FIG. 13) to the time when the TCP speed V converges to the command speed Vc (time t3 in FIG. 9 to FIG. 13). Below, the former section will be referred to the "first section S1", while the latter section will be referred to as the "second section S2". Next, the evaluating part 14 of the present example judges monotonicity of the first section S1 and second section S2 of the waveform of the variation with time. That is, the evaluating part 14 of the present example judges if the TCP speed V decreases monotonously or non-monotonously in the first section S1 and also judges if the TCP speed V increases monotonously or non-monotonously in the second section S2. Further, the evaluating part 14 of the present example evaluates which of a plurality of types the pattern of variation with time can be classified as, based on the results of evaluation of the monotonicity.

Here, in the program correcting device 1 of the present example, the following explained first to fourth types are defined in advance as the plurality of types which indicate patterns of the TCP speed variation. The first type expresses a pattern of the TCP speed variation where the waveform of the TCP speed variation monotonously decreases in the first section S1 and monotonously increases in the second section S2 (see FIG. 9). The second type expresses a pattern of the TCP speed variation where the waveform of the TCP speed variation monotonously decreases in the first section S1 and non-monotonously increases in the second section S2 (see FIG. 10 and FIG. 11). The third type expresses a pattern of the TCP speed variation where the waveform of the TCP speed variation non-monotonously decreases in the first section S1 and monotonously increases in the second section S2 (see FIG. 12). Further, the fourth type expresses a pattern where the waveform of the TCP speed variation non-monotonously decreases in the first section S1 and non-monotonously increases in the second section S2 (see FIG. 13). That is, the evaluating part 14 of the present example specifies which of the above first to the fourth types of the pattern of the TCP speed variation is classified as. The result of pattern evaluation by the evaluating part 14 is transmitted to the later explained selecting part 15.

Referring again to FIG. 2, the selecting part 15 of the program correcting device 1 has the function of selecting a correction scheme for correcting the operating program in accordance with the result of evaluation of the pattern by the evaluating part 14. Here, in the program correcting device 1 of the present example, a plurality of correction schemes are defined in advance, and in particular the following explained first to the third correction schemes are defined for increasing the minimum value Vmi of the TCP speed V. The first correction scheme is a correction scheme which comprises specifying the operating command where the TCP speed V starts to decrease from the command speed Vc in the plurality of operating commands contained in the operating program, and adding a new operating command right after the specified operating command. Further, the second correction scheme is a correction scheme which comprises specifying the operating command where the TCP speed V starts to decrease from the command speed Vc in the plurality of operating commands contained in the operating program, and changing the content right after the specified operating command.

Further, the third correction scheme is a correction scheme which comprises specifying the operating command where the TCP speed V reaches the minimum value Vmi in the plurality of operating commands contained in the operating program, and deleting the operating command which is arranged right before the specified operating command. The above-mentioned first to third correction schemes are stored in advance in the memory part 1M of the program correcting device 1 etc. In particular, the first to the third correction schemes are stored in association with any of the plurality of types which show the above-mentioned patterns of the TCP speed variation. For example, the first correction scheme of the operating program is associated with the first type of the pattern of the TCP speed variation, while the second correction scheme of the operating program is associated with the second type of the pattern of the TCP speed variation. Further, the third correction scheme of the operating program is associated with the third type and the fourth type of the pattern of the TCP speed variation.

That is, the selecting part 15 of the present example is designed to select the correction scheme which is associated with the type specified by the pattern evaluation as the correction scheme of the operating program for increasing the minimum value Vmi of the TCP speed V. For example, when the pattern of the TCP speed variation is classified as the first type (see FIG. 9), the first correction scheme which is associated with the first type is selected. Similarly, when the pattern of the TCP speed variation is classified as the second type (see FIG. 10 and FIG. 11), the second correction scheme which is associated with the second type is selected. Similarly, when the pattern of the TCP speed variation is classified as the third type or the fourth type (see FIG. 12 and FIG. 13), the third correction scheme which is associated with these types is selected.

Referring again to FIG. 2, the correcting part 16 of the program correcting device 1 has the function of correcting the operating program in accordance with the correction scheme selected by the selecting part 15. For example, if the selecting part of the program correcting device 1 selects the first correction scheme, the correcting part 16 of the present example adds a new operating command right after the operating command where the TCP speed V starts to decrease from the command speed Vc. FIG. 14 is a schematic view which shows the result of correcting the operating program of FIG. 3 in accordance with the first correction scheme. As explained above, the pattern of the TCP speed variation according to the operating program of FIG. 3 is classified as the first type (see FIG. 9). Normally, the operating command where the TCP speed V starts to decrease from the command speed Vc at the first type is an operating command for moving the tip of the tool to the second teaching point P2 (for example, see fifth line in FIG. 3). As will be understood by comparing FIG. 3 and FIG. 14, a new operating command for moving the tip of the tool from the second teaching point P2 to the fifth teaching point P5 is added to the operating program (see sixth line in FIG. 14) in accordance with the first correction scheme.

The new speed command value in the operating command is larger than the command speed Vc (Vc=100 mm/sec). In the example of FIG. 14, the new speed command value in the operating command is 150 mm/sec. Here, the period when the tip of the tool is moved from the second teaching point P2 to the fifth teaching point P5 corresponds to part of the second section S2 of the above-mentioned TCP speed variation. For this reason, if the operating program is corrected in accordance with the first correction scheme, the graph of the TCP speed variation can be deformed so that the TCP speed V approaches a speed command value which is larger than the command speed Vc in the second section S2 (for example 150 mm/sec). Due to this, the minimum value Vmi of the TCP speed V according to the corrected operating program is expected to be larger than the minimum value Vmi of the TCP speed V according to the operating program before correction.

Further, if the selecting part 15 of the program correcting device 1 selects the second correction scheme, the correcting part 16 of the present example changes the content of the operating command which is arranged right after the operating command where the TCP speed V starts to be decreased from the command speed Vc. FIG. 15 is schematic view which shows the result of correction of the operating program of FIG. 6 in accordance with the second correction scheme. As explained above, the pattern of the TCP speed variation according to the operating program of FIG. 6 is classified as the second type (see FIG. 11). Normally, the operating command where the TCP speed V starts to decrease from the command speed Vc in the second type is an operating command for moving the tip of the tool to the second teaching point P2 (for example, fifth line in FIG. 6). As will be understood by comparing FIG. 6 and FIG. 15, the speed command value in the operating command (sixth line) for moving the tip of the tool from the second teaching point P2 to the fifth teaching point P5 is changed in accordance with the second correction scheme of the present example. More specifically, in the example of FIG. 15, the speed command value in the operating command of the sixth line is changed from 100 mm/sec to 150 mm/sec.

In this way, the second correction scheme of the present example comprises increasing the speed command value in the operating command right after the operating command where the TCP speed V starts to decrease (see sixth line of FIG. 6 and FIG. 15). In particular, when the speed command value is the command speed Vc or less, the speed command value is made larger than the command speed Vc. Here, the period during when the tip of the tool moves from the second teaching point P2 to the fifth teaching point P5 corresponds to part of the above-mentioned second section S2 of the TCP speed variation. For this reason, if the operating program is corrected in accordance with the second correction scheme, the graph of the TCP speed variation can be deformed so that the TCP speed V approaches a larger speed command value in the second section S2 (for example 150 mm/sec). Due to this, the minimum value Vmi of the TCP speed V according to the corrected operating program is expected to be larger than the minimum value Vmi of the TCP speed V according to the operating program before correction. Note that, the second correction scheme of the present example can further comprises, in accordance with need, changing the position command, acceleration command, positioning command, etc. in the operating command right after the operating command where the speed of movement V starts to decrease.

Further, if the selecting part 15 of the program correcting device 1 selects the third correction scheme, the correcting part 16 of the present example deletes the operating command which is arranged right before the operating command where the TCP speed V reaches the minimum value Vmi from the plurality of operating commands which are contained in the operating program. FIG. 16 is a schematic view which shows the result of correction of the operating program of FIG. 7 in accordance with the third correction scheme. As explained above, the pattern of the TCP speed variation according to the operating program of FIG. 7 is classified as the third type (see FIG. 12). Usually, the operating command where the TCP speed V reaches the minimum value Vmi in the third type is an operating command for moving the tip of the tool to the second teaching point P2 (for example, see sixth line of FIG. 7). As will be understood if comparing FIG. 7 and FIG. 16, due to the third correction scheme of the present example, the operating command (fifth line) which is arranged right before the operating command (sixth line) for moving the tip of the tool to the second teaching point P2 is deleted. More specifically, in the example of FIG. 16, the operating command for moving the tip of the tool from the first teaching point P1 to the sixth teaching point P6 at a speed of 100 mm/sec (see fifth line) is deleted.

As explained in FIG. 12 and FIG. 13, an operating command which is arranged right before the operating command where the movement speed V reaches the minimum value Vmi (fifth line in FIG. 7 and FIG. 8) can cause the TCP speed variation to be non-monotonous in the first section S1. For this reason, if the operating command is deleted in accordance with the third correction scheme, the graph of the TCP speed variation can be deformed so that the movement speed V of the tip of the tool monotonously decreases in the first section S1. That is, if the operating program of FIG. 7 is corrected in accordance with the third correction scheme, the pattern of the TCP speed variation is changed from the third type to the first type.

FIG. 17 is a schematic view which shows the result of correction of the operating program of FIG. 8 in accordance with the third correction scheme. As explained above, the pattern of the TCP speed variation by the operating program of FIG. 8 is classified as the fourth type (see FIG. 13). Normally, the operating command in the fourth type where the movement speed V reaches the minimum value Vmi is an operating command for moving the tip of the tool to the second teaching point P2 (for example, see FIG. 8, sixth line). As will be understood comparing FIG. 8 and FIG. 17, in accordance with the third correction scheme of the present example, the operating command (see fifth line) which is arranged right before the operating command (sixth line) for moving the tip of the tool to the second teaching point P2 is deleted. More specifically, in the example of FIG. 17, the operating command for moving the tip of the tool from the first teaching point P1 to the sixth teaching point P6 at a speed of 100 mm/sec is deleted. In the same way as the example of FIG. 16, if the operating command is deleted in accordance with the third correction scheme, the graph of the TCP speed variation can be deformed so that the TCP speed V monotonously decreases in the first section S1. That is, if the operating program of FIG. 8 is corrected in accordance with the third correction scheme, the pattern of the TCP speed variation is changed from the fourth type to the second type.

Figure 18:
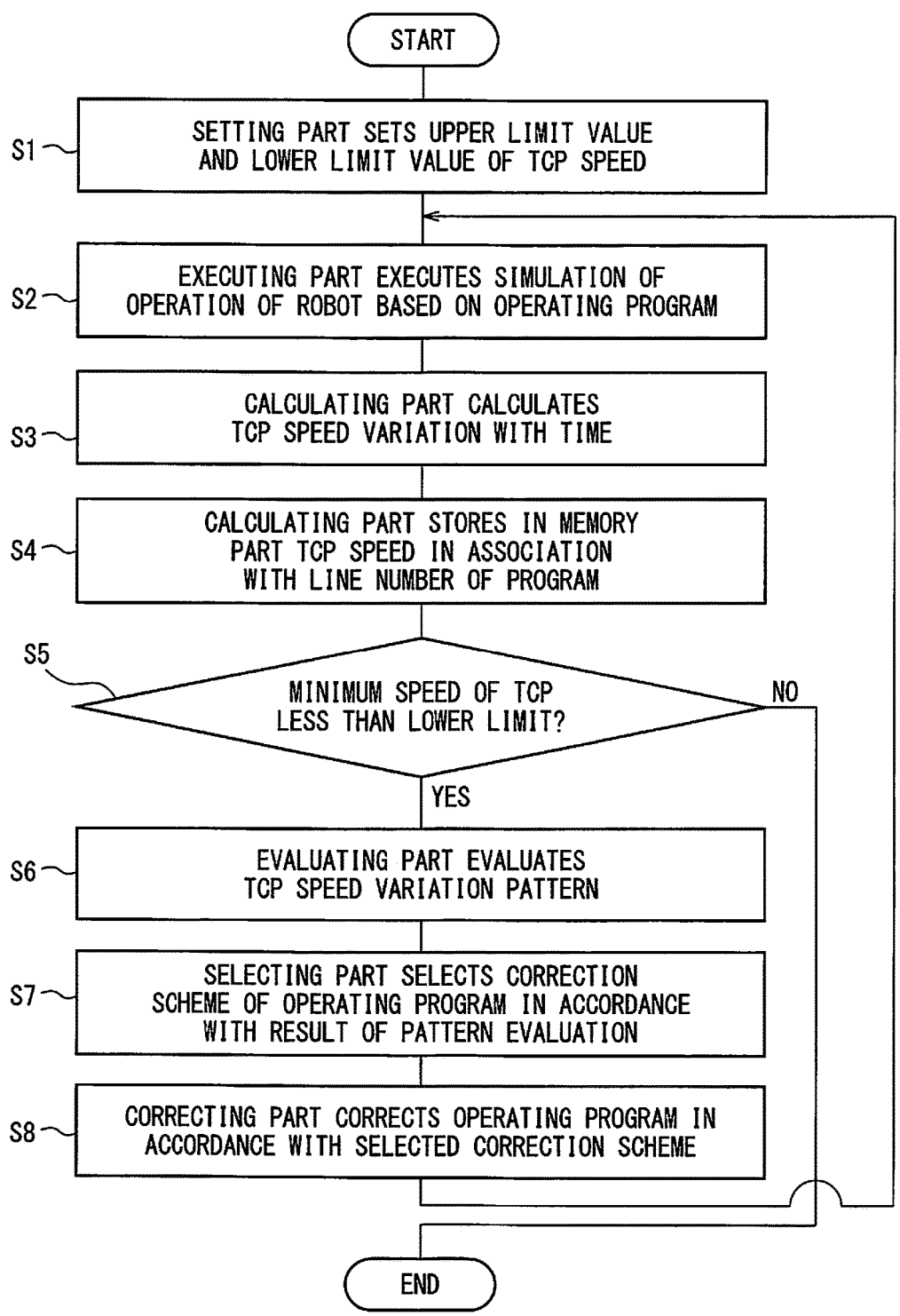
FIG. 18 is a flow chart which shows the routine by which the program correcting device of the present embodiment corrects the operating program of a robot.

Next, the operation of the program correcting device 1 of the present embodiment will be explained in brief. FIG. 18 is a flow chart which shows the routine by which the program correcting device 1 of the present embodiment corrects the operating program of the robot 2. As shown in FIG. 18, at step S1, the setting part 12 of the program correcting device 1 sets the upper limit value U and the lower limit value L of the TCP speed V for the period when the tip of the tool of the robot 2 passes the corner CN. The upper limit value U and the lower limit value L are designated in advance by the operator and stored in the memory part 1M etc. At step S2, the executing part 10 of the program correcting device 1 executes the simulation of operation of the robot 2 based on the operating program of the memory part 1M. At step S3, the calculating part 11 of the program correcting device 1 calculates the variation with time of the TCP speed V. More specifically, at step S3, the calculating part 11 calculates the variation with time of the TCP speed V at a predetermined cycle from the results of simulation of operation executed at step S2. At step S4, the calculating part 11 stores the TCP speed V which has been calculated at a predetermined cycle in association with a line number of the operating program.

At step S5, the judging part 13 of the program correcting device 1 judges if the minimum value Vmi of the TCP speed V is less than the lower limit value L. If the minimum value Vmi of the TCP speed V is larger than the lower limit value L (NO at step S5), there is no need to correct the operating program, and therefore the program correcting device 1 ends the flow chart. On the other hand, if the minimum value Vmi of the TCP speed V is less than the lower limit value L (YES at step S5), the evaluating part 14 of the program correcting device 1 evaluates the pattern of the TCP speed variation for the period when the tip of the tool passes the corner CN (step S6). More specifically, at step S6, the evaluating part 14 classifies the pattern of the TCP speed variation as any of the predefined plurality of types (that is, the first to the fourth types).

At step S7, the selecting part 15 of the program correcting device 1 selects the correction scheme of the operating program for increasing the minimum value Vmi of the TCP speed V in accordance with the result of evaluation of the pattern by the evaluating part 14. More specifically, at step S7, the selecting part 15 selects any of the plurality of correction schemes in accordance with the result of evaluation of the pattern by the evaluating part 14 (that is, the first to the third correction schemes). As explained above, the memory part 1M of the program correcting device 1 stores each of the plurality of correction schemes of the operating program in association with one of the plurality of types which indicate the pattern of the TCP speed variation. That is, at step S7, the selecting part 15 selects a correction scheme associated with the type which has been specified by the pattern evaluation as the correction scheme for increasing the minimum value Vmi of the TCP speed V. For example, if the pattern of the TCP speed variation is the first type (see FIG. 9), the selecting part 15 selects the first correction scheme comprising adding a new operating command right after the operating command where the TCP speed V starts to decrease from the command speed Vc.

Further, if the pattern of the TCP speed variation is the second type (see FIG. 11), the selecting part 15 selects the second correction scheme comprising changing the content of the operating command which is arranged right after the operating command where the TCP speed V starts to decrease from the command speed Vc. Further, if the pattern of the TCP speed variation is the third type (see FIG. 12), the selecting part 15 selects the third correction scheme comprising deleting the operating command right before the operating command where the TCP speed V reaches the minimum value Vmi. If the pattern of the TCP speed variation is the fourth type (see FIG. 13) as well, the selecting part 15 selects the third correction scheme comprising deleting the operating command right before the operating command where the TCP speed V reaches the minimum value Vmi.

Referring again to FIG. 18, at step S8, the correcting part 16 of the program correcting device 1 corrects the operating program according to the correction scheme selected at step S7. That is, at step S8, the correcting part 16 corrects the operating program according to any of the first to the third correction schemes. After that, steps S2 to step S4 of the corrected operating program are again executed. Next, the judging part 13 of the program correcting device 1 again judges if the minimum value Vmi of the TCP speed V according to the corrected operating program is the lower limit value L or less (step S5). Further, if the minimum value Vmi of the TCP speed V is larger than the lower limit value L (NO at step S5), the flow chart is ended, while if the minimum value Vmi of the TCP speed V is the lower limit value L or less (YES at step S5), steps S6 to S8 of the corrected operating program are again executed. In this way, the program correcting device 1 of the present example repeatedly corrects the operating program in accordance with any of the first to the third correction schemes until the minimum value Vmi of the TCP speed V becomes larger than the lower limit value L.

Figure 19:
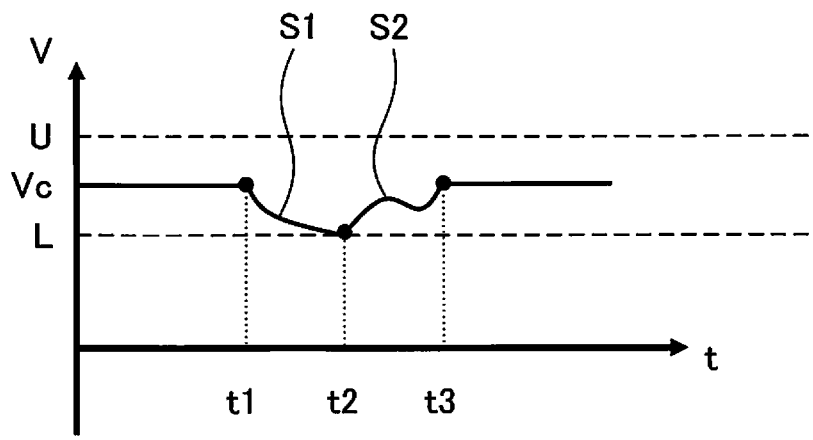
FIG. 19 is a first graph which shows the variation with time of the movement speed V of the tip of the tool which corresponds to the operating program which was corrected by the program correcting device of the present embodiment.
Figure 20:
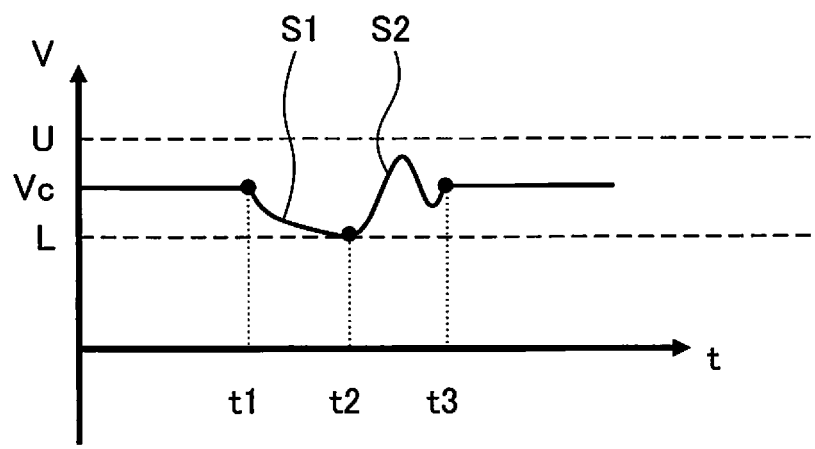
FIG. 20 is a second graph which shows the variation with time of the movement speed V of the tip of the tool which corresponds to the operating program which was corrected by the program correcting device of the present embodiment.

FIG. 19 and FIG. 20 are graphs which show the variation with time of the TCP speed V corresponding to the operating program which has been corrected by the program correcting device 1 of the present embodiment. The patterns of the TCP speed variation shown in FIG. 19 and FIG. 20 are both classified as the second type. However, these two patterns differ from each other in the magnitude of the local maximum value in the second section S2. Such a difference of the local maximum value is due to the difference in the speed command values of the operating commands for moving the tip of the tool from the second teaching point P2 to the fifth teaching point P5. More specifically, in the example of FIG. 19, the speed command value in the operating command is set to 120 mm/sec, while in the example of FIG. 20, the speed command value in the operating command is set to 180 mm/sec.

A speed variation such as FIG. 19 and FIG. 20 can, for example, be achieved by applying in sequence the first correction scheme and the second correction scheme to an operating program which involves a pattern of the TCP speed variation of the first type as shown in FIG. 9. However, if the minimum value Vmi of the TCP speed V becomes larger than the lower limit value L as a result of application of the first correction scheme, it is no longer necessary to apply the second correction scheme. Further, after application of the first correction scheme, application of the second correction scheme may be repeated two times or more. Alternatively, a speed variation such as FIG. 19 and FIG. 20 can be achieved by applying the second correction scheme to an operating program which involves a speed variation of the second type as shown in FIG. 11. In this case, application of the second correction scheme may be repeated two times or more.

Alternatively, a speed variation such as FIG. 19 and FIG. 20 can be achieved by applying the third correction scheme, the first correction scheme, and the second correction scheme in sequence to an operating program which involves a pattern of the TCP speed variation of the third type as shown in FIG. 12. However, if the minimum value Vmi of the TCP speed V becomes larger than the lower limit value L as a result of application of the third correction scheme and the following first correction scheme, it is no longer necessary to apply the second correction scheme. Further, after application of the third correction scheme and the following first correction scheme, the second correction scheme may be repeated two times or more. Alternatively, a speed variation such as FIG. 19 and FIG. 20 can be achieved by applying the third correction scheme and the second correction scheme in sequence to an operating program which involves a pattern of the TCP speed variation of the fourth type as shown in FIG. 13. However, if the minimum value Vmi of the TCP speed V becomes larger than the lower limit value L as a result of application of third correction scheme, it is no longer necessary to apply the second correction scheme. Further, after execution of the third correction scheme, the second correction scheme may be repeated two times or more.

In the above way, according to the program correcting device 1 of the present example, if the minimum value Vmi of the TCP speed V is the lower limit value L or less, the pattern of the TCP speed variation is evaluated (see step S6) and a suitable correction scheme of the operating program is selected in accordance with the result of evaluation of the pattern of the TCP speed variation (see step S7). Therefore, according to the program correcting device 1 of the present example, it is possible to reduce the drop in speed of the tip of the tool by just correcting an existing operating program without changing the hardware settings of the robot 2.

Further, according to the program correcting device 1 of the present example, the operating program is repeatedly corrected until the minimum value Vmi of the TCP speed V becomes the lower limit value L or less (see step S5). Therefore, according to the program correcting device 1 of the present example, it is possible to reliably prevent a drop in the processing precision (for example, to prevent excessive processing) due to the TCP speed V decreasing beyond the lower limit value L.

Further, according to the program correcting device 1 of the present example, the TCP speed variation for the period when a plurality of operating commands in the operating program are executed, are calculated in sequence, and therefore it is possible to confirm the correspondence between each of the plurality of operating commands and the TCP speed variation. Therefore, according to the program correcting device 1 of the present example, it is possible to specify an operating command where the TCP speed V starts to decrease from the command speed Vc, an operating command where the TCP speed V reaches the minimum value Vmim, etc.

Further, according to the program correcting device 1 of the present example, it is possible to select a correction scheme suitable for a pattern of the TCP speed variation which is involved in a typical operating program. In particular, according to the program correcting device 1 of the present example, it is possible to select a first correction scheme suitable for a pattern of the TCP speed variation where the TCP speed V monotonously decreases in the first section S1 and monotonously increases in the second section S2 (that is, the first type). Similarly, according to the program correcting device 1 of the present example, it is possible to select a second correction scheme suitable for a pattern of the TCP speed variation where the TCP speed V monotonously decreases in the first section S1 and non-monotonously increases in the second section S2 (that is, the second type). Similarly, according to the program correcting device 1 of the present example, it is possible to select a third correction scheme suitable for a pattern of the TCP speed variation where the TCP speed V non-monotonously decreases in the first section S1 (that is, the third type and the fourth type).

Effect of Invention

According to the first and eighth aspects of the present invention, if the minimum value of the movement speed of the tip of the tool is the lower limit value or less, the pattern of the speed variation of the tip of the tool is evaluated, and a suitable correction scheme of the operating program corresponding to the result of evaluation of the pattern of the speed variation is selected. Therefore, according to the first and eighth aspects, it is possible to reduce the drop in speed of the tip of the tool by just correcting an existing operating program without changing the hardware settings of a robot.

According to the first and ninth aspects of the present invention, the operating program is repeatedly corrected until the minimum value of the movement speed of the tip of the tool becomes the lower limit value or less. Therefore, according to the first and ninth aspects, it is possible to reliably prevent a drop in the processing precision (for example prevent excessive processing) caused by the movement speed of the tip of the tool decreasing below the lower limit value.

According to the third and the 10th aspects of the present invention, the speed variation of the tip of the tool for the period when a plurality of operating commands in an operating program are executed, are calculated in sequence, and therefore it is possible to confirm the correspondence between the plurality of operating commands and the speed variation of the tip of the tool. Therefore, according to the third and the 10th aspects, it is possible to specify the operating command where the movement speed of the tip of the tool starts to decrease from the command speed, the operating command where the movement speed of the tip of the tool reaches the minimum value, etc.

According to the fourth to seventh aspects and the 11th to the 14th aspects of the present invention, it is possible to select a correction scheme suitable for the pattern of speed variation of the tip of the tool which results from a typical operating program. In particular, according to the fifth and the 12th aspects, it is possible to select a first correction scheme suitable for a pattern of the speed variation where the movement speed of the tip of the tool decreases monotonously in the first section and increases monotonously in the second section. Similarly, according to the sixth and the 13th aspects, it is possible to select a second correction scheme suitable for a pattern of the speed variation where the movement speed of the tip of the tool monotonously decreases in the first section and non-monotonously increases in the second section. Similarly, according to the seventh and the 14th aspects, it is possible to select the third correction scheme suitable for a pattern of the speed variation where the movement speed of the tip of the tool non-monotonously decreases in the first section.

The present invention is not limited to only the above embodiments and can be changed in various ways within the scope which is described in the claims. For example, the operating programs shown in FIG. 3 and FIG. 5 to FIG. 8 etc. are only typical examples. The operating program of the robot 2 according to the present invention is not limited to these. Similarly, the first to the fourth types are only typical examples of the patterns of speed variation of a tip of the tool, while the first to the third correction schemes are only typical examples of the correction schemes of the operating program. That is, it should be noted that the other types of patterns of speed variation and other correction schemes of the operating program can be employed within the scope of the present invention. Further, the functions and configurations of the various devices of the robot system which are described in the embodiments are only illustrations. Various functions and configurations can be employed for achieving the effects of the present invention.

The ivention claimed is:

1. A program correcting device which corrects an operating program of a robot for moving a tip of a tool which is attached to said robot along a predetermined movement path at a command speed, the device comprising:
at least one processor configured to:
execute a simulation of operation of said robot based on said operating program,
calculate a variation with time of a movement speed of said tip for the period when said tip passes through said of movement path from the results of said simulation of operation,
evaluate a pattern of said variation with time calculated by said calculating part if a minimum value of said movement speed during said variation with time calculated by said calculating part is a predetermined lower limit value or less,
select a correction scheme of said operating program for increasing said minimum value of the movement speed from a predetermined plurality of correction schemes, in accordance with the results of evaluation of the pattern of said variation with time,
correct said operating program in accordance with the correction scheme, and
instructing the robot to move the tip of the tool based on the corrected operating program.

2. The program correcting device according to claim 1, wherein said processor is configured to repeatedly correct said operating program until a minimum value of said movement speed during said variation with time becomes larger than said lower limit value.

3. The program correcting device according to claim 1, wherein
said operating program comprises a plurality of operating commands to be executed in sequence, and
said processor is configured to calculate said variation with time while said plurality of operating commands are executed in sequence.

4. The program correcting device according to claim 3, wherein said processor is configured to evaluate the pattern of said variation with time based on monotonicity of the variation with time in a first section between the time when said movement speed starts to decrease from said command speed and the time when said movement speed reaches the minimum value, and in a second section between the time when said movement speed starts to increase from the minimum value and the time when said movement speed converges to said command speed.

5. The program correcting device according to claim 4, wherein
said plurality of correction schemes include a first correction scheme which comprises adding a new operating command right after the operating command among said plurality of operating commands where said movement speed starts to decrease from said command speed, and
said processor is configured to select said first correction scheme if said variation with time in said first section is a monotonous decrease and said variation with time in said second section is a monotonous increase.

6. The program correcting device according to claim 4, wherein
said plurality of correction schemes include a second correction scheme which comprises changing an operating command right after the operating command among said plurality of operating commands where said movement speed starts to decrease from said command speed, and
said processor is configured to select said second correction scheme if said variation with time is said first section is a monotonous decrease and said variation with time in said second section a non-monotonous increase.

7. The program correcting device according to claim 4, wherein
said plurality of correction schemes include a third correction scheme which comprises deleting an operating command right after the operating command among said plurality of operating commands where said movement speed reaches the minimum value, and
said processor is configured to select said third correction scheme if said variation with time in said first section is a non-monotonous decrease.

8. A program correcting method which corrects an operating program for moving a tip of a tool which is attached to a robot along a predetermined movement path at a command speed, comprising
executing a simulation of operation of said robot based on said operating program,
calculating a variation with time of a movement speed of said tip for the period when said tip passes through said movement path from the results of said simulation of operation,
evaluating a pattern of the calculated variation with time if a minimum value of said movement speed during the calculated variation with time is a predetermined lower limit value or less,
selecting a correction scheme of said operating program for increasing said minimum value of the movement speed from a predetermined plurality of correction schemes, in accordance with the results of evaluation of the pattern of the variation with time,
correcting said operating program in accordance with the selected correction scheme, and moving the tip of the tool, using the robot, based on the corrected operating program.

9. The program correcting method according to claim 8 further comprising repeatedly correcting said operating program until a minimum value of said movement speed during the variation with time becomes larger than said lower limit value.

10. The program correcting method according to claim 8, wherein
said operating program comprises a plurality of operating commands to be executed in sequence, and
said program correcting method further comprises calculating the variation with time while said plurality of operating commands are executed in sequence.

11. The program correcting method according to claim 10 further comprising evaluating the pattern of the variation with time based on monotonicity of the variation with time in a first section between the time when said movement speed starts to decrease from said command speed and the time when said movement speed reaches the minimum value and in a second section between the time when said movement speed starts to increase from the minimum value and the time when said movement speed converges to said command speed.

12. The program correcting method according to claim 11, wherein
said plurality of correction schemes include a first correction scheme which comprises adding a new operating command right after the operating command among said plurality of operating commands where said movement speed starts to decrease from said command speed, and
the program correcting method further comprises selecting said first correction scheme if the variation with time in said first section is a monotonous decrease and the variation with time in said second section is a monotonous increase.

13. The program correcting method according to claim 11, wherein said plurality of correction schemes include a second correction scheme which comprises changing an operating command right after the operating command among said plurality of operating commands where said movement speed starts to decrease from said command speed, and
the program correcting method further comprises selecting said second correction scheme if the variation with time in said first section is a monotonous decrease and the variation with time in said second section is a non-monotonous increase.

14. The program correcting method according to claim 11, wherein
said plurality of correction schemes include a third correction scheme which comprises deleting an operating command right after the operating command among said plurality of operating commands where said movement speed reaches the minimum value, and
the program correcting method further comprises selecting said third correction scheme if the variation with time in said first section is a non-monotonous decrease.

* * * * *